United States Patent [19]
Hyer

[11] Patent Number: 5,591,942
[45] Date of Patent: Jan. 7, 1997

[54] TEMPERATURE-COMPENSATED BELT SCALE

[75] Inventor: Frank S. Hyer, Duxbury, Mass.

[73] Assignee: Hyer Industries, Inc., Pembroke, Mass.

[21] Appl. No.: 148,286

[22] Filed: Nov. 8, 1993

[51] Int. Cl.$^6$ ................................................ G01G 11/14
[52] U.S. Cl. ...................... 177/16; 177/25.12; 177/119
[58] Field of Search ................................ 177/16, 25.12, 177/119

[56] References Cited

U.S. PATENT DOCUMENTS

| | | | |
|---|---|---|---|
| 3,559,451 | 2/1971 | Hyer et al. | 73/1 |
| 3,754,126 | 8/1973 | Williams, Jr. | 177/16 |
| 3,924,729 | 12/1975 | Flinth et al. | 177/16 |
| 3,979,055 | 9/1976 | Fathauer et al. | 177/119 |
| 4,418,774 | 12/1983 | Whitney et al. | 177/210 FP |
| 4,463,816 | 8/1984 | MacFarlane | 177/119 |
| 4,464,725 | 8/1984 | Briefer | 177/25.12 X |
| 4,796,212 | 1/1989 | Kitagawa | 177/25.11 X |
| 4,858,145 | 8/1989 | Inoue et al. | 177/25.11 X |
| 4,914,611 | 4/1990 | Yamanaka et al. | 177/25.12 X |
| 5,119,893 | 6/1992 | Jost | 177/16 |

OTHER PUBLICATIONS

"Belt Scale Calibration–Test Weight or Test Chain," Hyer, F. S. and Colijn, H., paper at ISA Conf., Chicago, Oct.4–7, 1971.

"Specifications, Tolerances, and Other Technical Requirements for Weighing and Measuring Devices," NIST Handbook 44, 1991.

"Views on Future Weight Determination of Bulk Cargoes," Orman, G., Trans Tech Publications, vol. 12, No. 2, May, 1992,ISSN0173–9980.

Primary Examiner—Michael L. Gellner
Assistant Examiner—Randy W. Gibson
Attorney, Agent, or Firm—Lahive & Cockfield

[57] ABSTRACT

An integrating system for measuring the total weight of material moved by an endless belt conveyor over a weighing scale. The system compensates for the effect of temperature upon the dimensions of the structures that transmit belt loading forces to the load cell. A temperature responsive transducer at the conveyor provides an input to a temperature compensating multiplier which introduces a temperature compensating factor into the weight computation.

13 Claims, 2 Drawing Sheets

TEMPERATURE-COMPENSATED BELT SCALE

SUMMARY OF THE INVENTION

This invention relates generally to conveyor belt scales, and more particularly to an integrating system for measuring and indicating the total weight of material moved over a weighing scale by an endless belt conveyor.

Systems of this type include a load cell mounted beneath the conveyor belt and one or more idlers in the form of rolls bearing upon the belt and transmitting belt load forces to the load cell. Integrating computers have been developed to integrate these belt load forces over a measured linear displacement of the belt, thereby computing the total weight of material that has been moved.

The foregoing systems are provided with computers that respond to changes in the variable belt loading, measured in units of weight per unit of belt length. The computers also respond to the displacement of the belt over which the integration is performed.

It has long been recognized that certain factors cause inaccuracies in the computation of the total conveyed weight, such as non-uniformity of the belt, material sticking to the belt, changes in belt stiffness and tension, and idler misalignments. Typically, the total length of belt travel for purposes of integration is sufficiently great as compared with the length of the belt loop to reduce or substantially eliminate the effects of belt weight non-uniformity. The effects of other factors are more difficult to eliminate, and accordingly it is common practice to design the weighing systems for periodic calibration.

Practices have been developed for several steps of calibration. Frequent "zero calibration" is performed to ensure that the net weight totalized by the computing system over a predetermined belt travel distance is zero when the belt is run empty. Further steps of calibration are typically performed with the scale loaded so that the computer records an integrated value over a predetermined belt travel distance, and the computer is provided with multiplier means to multiply the integrated output from the scale by factors adjusted so that the totalized value recorded by the computer correctly corresponds to the test loading on the scale. These calibration methods are more particularly described below. In present practice, the computation is typically performed by detecting and measuring the belt loading identified herein as "Q" and the belt travel distance over which the integration is performed, without the inclusion of factors or terms representing the changes in spacing of the belt supporting idler rolls that result from changes in the temperature at which the belt scale is operating.

In present practice, great attention is paid to improving the accuracy and precision of the load cell components of these systems. In the United States, the Department of Commerce has established a National Institute of Standards and Technology (NIST) which has published a Handbook 44 that sets forth specifications, tolerances and other technical requirements for belt scales used for commercial weighing. In order to assure the public that scales will meet these established requirements, the National Conference on Weights and Measures has established technical committees to set up National Type Evaluation Procedures for approval (NTEP). In particular, the technical committee on National Type Evaluation-Belt Conveyor Sector has established a program to certify belt scale equipment through rigorous performance testing. In this testing the load cells are tested statically in a manner similar to that employed for testing static platform scales. The assumed objective is that the load cell should weigh static test loads accurately over a typical temperature range of 14° F. to 104° F., as a prerequisite to accurate dynamic weighing in a belt conveyor. The criteria for testing include the temperature effect on zero and the temperature effect on span or output sensitivity. The objective is to measure how closely the output characteristic of the load cell matches the ideal linear correspondence between the static load (x-coordinate) and the output (y-coordinate) over a prescribed temperature range. The temperature effect on zero is measured by the vertical shift in the entire output characteristic as a function of temperature over the prescribed range, stated for example in parts per million of the maximum rated weight capacity of the load cell per degree of temperature. The temperature effect on span or output sensitivity is measured by the change in the slope of the output characteristic as a function of temperature, stated for example in parts per million of the output per degree of temperature.

In a belt scale, the temperature effect on zero is ordinarily eliminated by performing an initial zero calibration just before each use of the scale. However, the temperature effect on span or output sensitivity is more difficult to eliminate, as it introduces a variable slope factor affecting the accuracy of other steps of calibration that are performed at less frequent intervals and at different temperatures.

The temperature tests in a proposed NTEP test program therefore require the output response of the load cell component itself as a function of temperature changes to be as close to zero as the state of the art permits. Typical tolerances are plus or minus 6 to 8 parts per million per degree F. for each of the zero and span tolerances. With this degree of available precision in the load cell component, particularly in the attainment of near-zero temperature effects on static weight measurements, the possibility exists for a fundamental improvement in the precision and accuracy of belt scales incorporating such load cells under dynamic loading.

There is a significant difference in output response between a static load scale and a belt scale. While the former has an output measured in units of weight, the latter has an output, herein represented by "Q," measured in units of weight per unit of length. The significance is that the output of a belt scale is affected by any change that occurs in the length dimension to which the scale is responsive. In so far as changes in such length dimension are the result of changes in temperature, they adversely affect the accuracy of a belt scale, notwithstanding its conformity with the above-described or similar static loading test programs and tolerances.

A principal object of the present invention is to improve the accuracy of belt scales with respect to their response to changes in the temperature of operation.

A second object is to provide improved methods and improved belt scale computing means enabling the scale to be calibrated and used for measuring loads in a manner that compensates for changes in load cell response arising solely from temperature changes.

With the foregoing and other objects in view, a principal feature of the present invention is the recognition of, and compensation for, the effects of temperature upon the load cell response as the result of dimensional changes in the scale suspension system. These changes affect the dimension "L" defining the distance between adjacent belt supporting idlers bearing upon the scale and between those idlers and the adjacent idlers supported on the conveyor structure. The dimension "L" is a function of the coefficient of linear expansion of the structural material comprising the scale suspension system and conveyor structure, specifically the support carriage for the idlers. In typical construction this support is made of carbon steel, although other materials such as stainless steel and aluminum may be employed. The linear coefficients of expansion, expressed in parts per million per degree F. are typically plus 7 for carbon steel, plus 9 for stainless steel and plus 12 for aluminum. It can be demonstrated that if the identical material is conveyed over a belt scale and weighed in two successive runs using a typical prior art belt scale, with the ambient temperature being greater for one run than for the other, the dimension "L" is measurably greater at the higher temperature and the force on the scale is greater by the same factor, resulting in a larger integrator output and an apparently greater total weight recorded by the scale during the run at the higher temperature.

With a view to eliminating the potential errors associated with these thermal effects, this invention provides a temperature compensating multiplier in the computer equipped with a thermal transducer to sense the ambient temperature at the conveyor. This multiplier provides a factor which, when appropriately included in the computation, compensates for errors due to variations that occur in the ambient temperature of the scale and conveyor structure.

According to a second feature of the invention, the calibration of the belt scale includes the determination of an S-factor and a K-factor corresponding to a particular reference temperature. In this manner, the temperature compensating multiplier employed during the normal use or weighing mode of the belt scale automatically eliminates errors arising from the ambient temperature of use.

According to another feature, the invention brings about modifications in the calibration procedure whereby the temperature compensating multiplier can be switched to provide a factor of "1" under certain conditions dependent upon whether or not the load on the scale is being applied through the belt.

Other features of the invention reside in certain methods of use and configurations of the elements of the computer circuits that will become evident from the following description.

DETAILED DESCRIPTION

Figure 1:
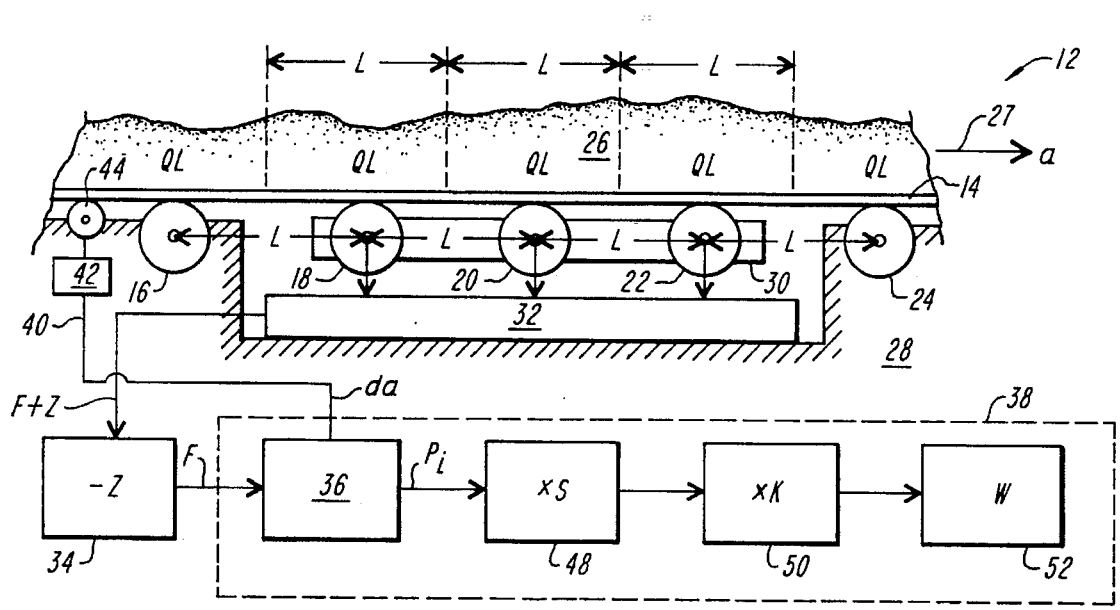
FIG. 1 is a partially schematic block diagram of a belt scale constructed according to the prior art, for purposes of explanation.

Referring to FIG. 1, a prior art belt scale shown generally at 12 comprises an endless conveyor belt 14 passing over a series of idlers 16, 18, 20, 22 and 24 equally spaced by a distance "L". The belt is loaded with particulate solids 26 and moves in the direction of the arrow 27. The belt is supported on a rigid frame 28 which supports belt end rolls (not shown) and intermediate idlers such as 16 and 24. A selected number of idlers, shown in the drawing as three idler rolls 18, 20 and 22, are rotatably supported on a full-floating idler support carriage 30, typically fabricated of metal. In the following description, the number of idlers is represented by "N" and is a matter of choice in design. The belt 14 bears down upon the idlers 18, 20 and 22, which transfer the belt load forces to a load cell 32. The load cell 32 is of the conventional type having an output response characteristic with respect to changes in the temperature, under static loading, that is as close to zero as possible. The output of the load cell represents the force applied to it and comprises an input to a zero shit operator 34. The output of the operator 34 comprises an input "F" to an integrator 36 forming an element of a computer 38. A second input to the integrator comprises a connection 40 from a belt travel transducer 42 driven by a roller 44 in rolling contact with the belt 14. The transducer 42 permits measurement of the distance "a" of belt travel from a predetermined starting position.

The output "$p_i$" from the integrator 36, hereinafter further described, passes through a succession of operative elements of the computer, the functions of which are also more particularly described hereinafter. Stated generally, these elements comprise a span multiplier 48 and a K-factor multiplier 50. The output of the multiplier 50 passes to a weight totalizer 52 which typically provides a visual digital representation or readout of the cumulative weight of the material 26 passing over the scale during a predetermined length of belt travel.

Figure 2:
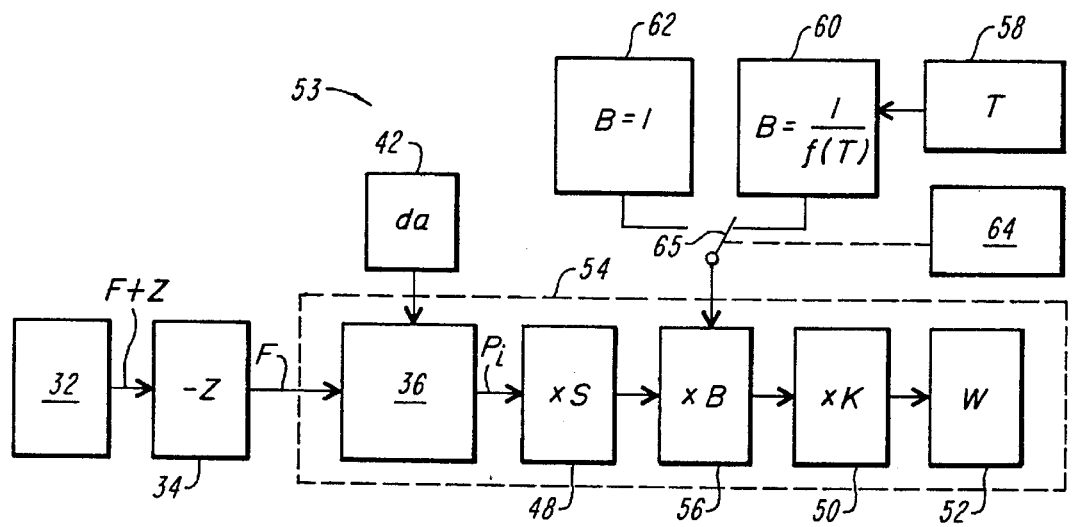
FIG. 2 is a similar block diagram showing a first embodiment of an improved integrating computer with temperature compensation according to the present invention, shown in condition for the normal weighing mode.

FIG. 2 illustrates a first embodiment 53 of an improved belt scale integrating and computing system comprising a computer 54 according to the present invention. In FIGS. 1 and 2, like reference numerals represent like elements. Except as noted below, the belt, idlers and structural pans of the scale and computer of FIG. 2 are the same as those represented in FIG. 1 and certain of these elements are omitted from FIG. 2 for simplicity of description. However, as will be evident from the following description, this invention is not limited by the particular structure of the idlers and idler support carriage 30, which is shown in FIG. 1 merely for purposes of illustration. In practice, various types and constructions of scale-suspension carriages are in common use. In place of the full floating, multiple idler weigh bridge shown, one or more pivoted arms may be employed to support one or more idler rolls and to transfer load forces therefrom to the load cell, all in accord with practices presently well known in belt scale technology. Presently known technology also includes the use of plural load cells in the suspension system in conjunction with circuit means to combine the outputs of the load cells. It should be understood that any form of scale-suspension and load cell system may be employed in the practice of this invention, provided that the output thereof is proportional to the belt load over a span including a plurality of idlers.

In FIG. 2, the improved computer 54 is provided with a temperature compensating multiplier 56 associated with a thermal transducer 58 which senses the temperature of the frame 28 in the immediate vicinity of the frame 30. As hereinafter more fully explained, the multiplier 56 is adapted to selectively introduce a factor "B" which varies with the temperature. This factor is introduced into the computation during the normal operating mode of the belt scale and ultimately affects the weight readout on the totalizer 52. The transducer 58 is connected to a factor generator 60 that computes a numerical output function $1/f(T)$ of the temperature. A factor element 62 is provided and adapted to produce a fixed output value of "B" equal to "1." A selector 64 is provided for manual or programmed selection by means of a switch 65 between the outputs of the generator 60 and the element 62. The multiplier 56 multiplies the numerical value of its input from the span multiplier 48 by the value of "B" selected by operation of the selector 64.

The factor "B" produced by the generator 60 depends upon the selection of a reference temperature "$T_r$". According to the invention, in general, any value of "$T_r$" may be selected, thus permitting a number of possible embodiments.

Figure 3:
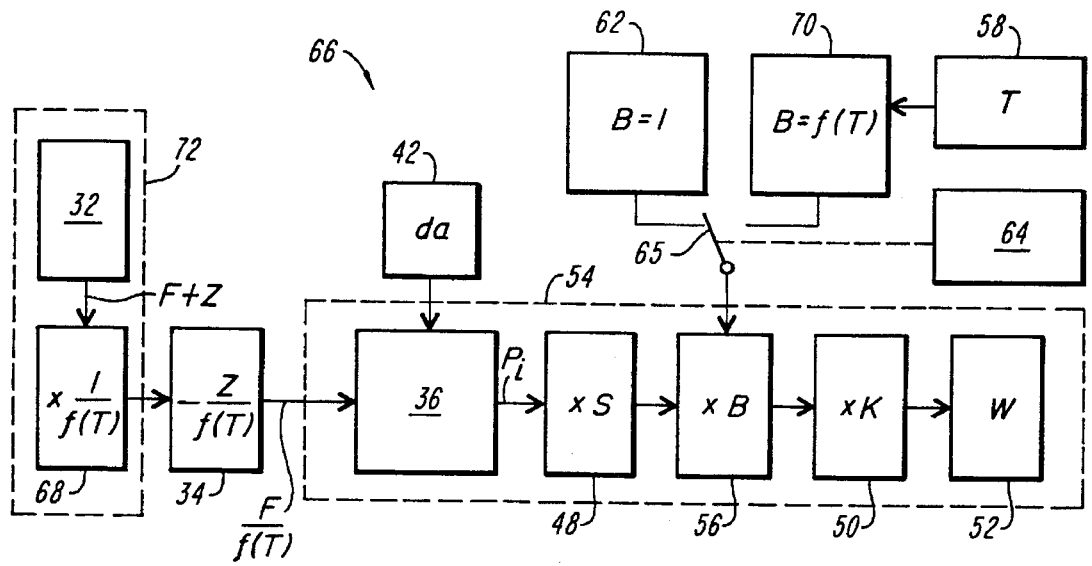
FIG. 3 is a block diagram similar to FIG. 2 showing a second embodiment of the invention, shown in condition for the normal weighing mode.

FIG. 3 illustrates a second embodiment 66 of the invention. In FIGS. 1, 2 and 3, like reference numerals represent like elements. As in the case of FIG. 2, any form of scale-suspension and load cell system may be employed to produce an output proportional to the belt load over a span including a plurality of idlers. In FIG. 3, temperature compensation means 68 are provided for the load cell 32 as hereinafter more fully explained. Also in FIG. 3, a factor generator 70 is provided which computes a numerical output function "f(T)" of the temperature as hereinafter more fully explained. As in FIG. 2, the factor "f(T)" depends upon the selection of a reference temperature "$T_r$".

Referring again to the prior art embodiment of FIG. 1, the following explanation provides, for comparison purposes, a basis upon which to explain the operation of the belt scale and associated computer 54 of FIGS. 2 and 3, and for comparing the latter with the functions and operation of the prior art computer 38.

For a belt scale 12 having "N" idlers and a distance "L" between the idler axes, the total force on the load cell 32 includes a fixed load "Z" arising from the weight of the frame 30, the idlers 18, 20 and 22 and the weight of the empty belt applied to the idlers, plus a variable load arising solely from the material 26 on the belt. The output of the load cell 32 is shifted by the operator 34 to subtract the value of the fixed load. The output of the operator 34 represents only the variable load and has a value "F" defined by $$F=NLQ \quad (1)$$

where "Q" is the variable material loading on the belt expressed in pounds per foot of belt length, kilograms per meter, or other corresponding units. The total weight "W" of the material 26 delivered by the belt upon moving a distance "A" is given by $$W = \int_0^A Q\,da = \int_0^A \frac{F\,da}{NL} \quad (2)$$

where "a" represents units of belt travel.

For the purpose of computing the integral of equation (2), the belt scale 12 of FIG. 1 is provided with the integrator 36 having the input "F" equal to the force applied by the material load to the load cell and an input differential "da" quantitatively varying with the movement of the belt. The integrator 36 computes the integral of equation (2) using a constant predetermined to represent the factor "$1/NL_1$", providing a totalized weight value "$p_i$". Thus;

$$\int_0^A \frac{F\,da}{NL_1} = p_i \quad (3)$$

where $L_1$ is a predetermined value of L assumed to be constant at all temperatures of operation. The variables employed in the computation by the integrator typically have certain inaccuracies, and according to conventional practice it is necessary to perform several steps of calibration.

A first calibration step in any case is "zero calibration" to adjust and set the value of "Z" such that the totalizer readout $$p_i = 0 \quad (4)$$

when the belt is run empty for an arbitrary belt travel distance preferably at least equal to one or more multiples of the length of the belt loop. In this calibration the zero shift operator 34 is adjusted and set to cause the integrated value "$p_i$" to satisfy equation (4). Zero calibration is typically performed immediately before each normal use of the scale to measure conveyed material. This may occur on a daily basis or even more frequently, either manually or automatically at intervals while the scale is in use.

In a second step of calibration the belt scale is "span calibrated" during a test run, in which the belt moves an arbitrarily selected distance "A" preferably at least equal to one or more multiples of the length of the belt loop. In this calibration a span constant value "S" is adjusted and set such that the totalizer readout $$(p_i)(S) = Q_s A \quad (5)$$

where "$Q_s$" is a simulated or test load created either (1) in a manner causing the load cell 32 to produce an output representing the test load without applying such load through the belt 14, or (2) by loading the belt with a test chain resting upon it. These are well known calibration methods. For case (1), a test load may be applied directly to the load cell, or the load cell output circuit may be provided with a resistor arranged to cause the output to assume the value that would result from a test load so applied. In the following description, these two variants of case (1) are assumed throughout to be equally applicable.

If the test load is created as in case (1), the factor "$Q_s$" is predetermined to equal the test load divided by "$NL_1$." If the test load is applied through the belt by a test chain as in case (2), the factor "$Q_s$" equals the weight of the chain per unit of length. During this test run the load "$Q_s$" preferably equals at least a predetermined fraction of the maximum belt loading "Q" applied during normal operation of the conveyor. In this calibration the span multiplier 48 in the computer is adjusted and set to multiply the output of the integrator 36 by the factor "S" required to satisfy equation (5) with the K-factor multiplier set to "1," whereby the value shown on the left side of equation (5) appears in the totalizer 52. Span calibration is typically performed less frequently than zero calibration, for example once a week.

In a third step of calibration the scale is "K-factored." The reason a K-factor is required is that calibration against simulated loads fails to take into account the effects that a loaded conveyor belt has on the measurements. For example, the conveyor belt tension during weighing is dependent on the actual material loading along the length of the belt, which is absent during simulated testing. Belt tension, in conjunction with vertical idler misalignments, causes erroneous forces to be present. Furthermore, the belt acts somewhat like a continuously supported beam which interferes with the measurement of a load placed on top of it. In fact the belt itself has beam like characteristics, in that it has an effective modulus of elasticity and a cross section moment of inertia which depends on the troughing angle. It is known that the modulus of elasticity of belting is temperature sensitive, and thus it can be argued that the elements of longitudinal strain of the belt as well as its apparent "spring rate" from the "beam" effects are partially due to temperature. For example, the higher the temperature, the more flexible the belting becomes, the softer the spring rate becomes, and the greater is the unit strain from the tension in the belt. In any event, all of the factors that make up the so called "belt influences" are routinely dealt with by the application of "K-factoring."

To perform K-factor calibration the steps of zero and span calibration are first performed as described above. Then a specific quantity of material 36 is delivered over the belt in a test run. A value "K" is adjusted and set such that the totalizer readout $$(p_i)(S)(K) = \text{weight on static scale} \tag{6}$$

where the value shown on the left side of equation (6) is the computed weight shown on the totalizer 52. In this calibration the K-multiplier 50 is adjusted and set to multiply the output of the span multiplier 48 by a factor "K", whereby the computed weight equals the weight of the identical material as measured independently on a static scale assumed to be of perfect accuracy. K-factor calibration of a belt scale is typically performed much less frequently than span calibration, for example every six months, because of the time and effort needed to make the required measurements.

In practice, a belt scale may be operated at any temperature over a range of values. It has been found that the weight readout on the totalizer 52 in the FIG. 1 embodiment by computation of the value shown on the left side of equation (6) is in error if the ambient temperature at the scale during normal weighing operations is other than the temperature at which the K-factor was determined during calibration. A significant cause of this error, as noted above, is the coefficient of linear expansion of the structural material forming the support 30 for the idlers. This affects the value of "L", and as shown in equation (1) it changes the value of "F" by the identical factor. For the same reason, errors occur if the ambient temperature during normal weighing is other than the temperature at which the S-factor was determined if the simulated load for that calibration was applied through the belt by a test chain.

For example, if the scale 12 of FIG. 1 were operated in the normal weighing mode at a temperature above that which existed when it was K-factor calibrated, the values of "L" and "F" would each be larger by the same percent than they were during such calibration. If the scale were provided with a computer that accurately performed the computation of equation (2), the change in the value of "F" would be exactly offset by the change in the value of "L" and the computed value of the totalized weight would be unaffected by the difference in temperature. However, as shown by equation (3), in the conventional belt scale computer 38 the factor representing "1/NL₁" in the integrator 36 is a constant unaffected by the actual temperature of operation. The result is that the increase in the value of "F" is reflected in the weight readout on the totalizer 52. Greater temperature differences produce greater errors in the totalized weight.

According to this invention, the above errors are corrected automatically by incorporating the multiplier 56 in the computer 54 of FIGS. 2 and 3. By this means a variable temperature compensating factor can be selectively introduced into the computation.

Referring to the embodiment of FIG. 2, the multiplier 56 is adapted to multiply the value input from the span multiplier 48 either by "1" or by a function "B" computed by the factor generator 60 and defined as follows.

$$B = 1/f(T) \tag{7}$$

The function "f(T)" is the formula of a curve representing the change in the value of "F" as a function of the temperature of the idler support structure in use, as sensed by the transducer 58. The function "f(T)" is the formula of a curve representing the change in the value of "L" as a function of the temperature. In theory according to this invention, it is immaterial whether this function is linear or curvilinear, or whether it is derived theoretically or empirically by measurements taken experimentally using a particular type or construction of scale suspension system. However, observation has shown that for the usual practice of this invention the formula may be expressed as follows.

$$f(T) = 1 + (\text{ppm})(10^{-6})(T - T_r) \tag{8}$$

where "ppm" is the coefficient of linear expansion of the material forming the support carriage 30 for the idlers expressed in parts per million per degree of temperature change on the temperature scale of choice, "T" is the ambient temperature detected by the transducer 58, and "$T_r$" is a selected reference temperature. The reference temperature can be any desired fixed temperature, and may be the same as, or different from, the temperature at which any calibration was conducted. Conveniently, the reference temperature is selected as zero on the temperature scale of choice.

In calibration of the scale of FIG. 2, zero calibration is conducted as described above with reference to FIG. 1. Span calibration, if carried out by applying a test load directly to the load cell and not through the belt, is also conducted as described with reference to FIG. 1, with the temperature compensating multiplier 56 as well as the K-multiplier 50 both set to the value "1."

Span calibration of the scale of FIG. 2, if carried out by applying a test load through the belt by a test chain, is conducted with the K-multiplier 50 set to "1" and the temperature compensating multiplier 56 producing a factor $B_s$. Thus, $$B_s = [1 + (\text{ppm})(10^{-6})(T_s - T_r)]^{-1} \tag{9}$$

where "$T_s$" is the ambient temperature when the span calibration is performed. The S-factor is adjusted and set to a value "$S_s$" that satisfies a variant of equation (5) as follows:

$$(p_i)(S_s)(B_s) = Q_s A. \tag{10}$$

K-factoring calibration of the scale of FIG. 2 is conducted with the temperature compensating multiplier 56 producing a factor "$B_k$". Thus, $$B_k = [1 + (\text{ppm})(10^{-6})(T_k - T_r)]^{-1} \tag{11}$$

where "$T_k$" is the ambient temperature when the K-factoring calibration is performed. The K-factor is adjusted and set to a value "$K_k$" that satisfies a variant of equation (6), as follows:

$$(p_i)(S_s)(B_k)(K_k) = \text{weight on static scale} \tag{12}$$

where "$S_s$" remains set at the value previously obtained during span calibration.

The normal weighing mode of the scale is conducted with the switch 65 in the position shown in FIG. 2, and with the temperature compensating multiplier 56 producing a factor "$B_i$". Thus, $$B_i = [1 + (\text{ppm})(10^{-6})(T_i - T_r)]^{-1} \tag{13}$$

where "$T_i$" is the ambient temperature during the normal weighing operation. The computer 54 of FIG. 2 computes the totalizer readout $$(p_i)(S_s)(B_i)(K_k) \quad (14)$$

where "$S_s$" and "$K_k$" remain set at the values previously obtained during respective S-factor and K-factor calibrations.

It will be noted by reference to equations (1) and (3) that the function f(T) in expression (8) is the factor by which "L," the force "F" input to the integrator and the computed integral "$p_i$" are all multiplied in every calibration or normal weighing operation at a temperature different from the reference temperature, provided that the force on the load cell is applied through the belt. Therefore, since "B" is the reciprocal of "f(T)", in each of the span calibration described by equation (10), the K-factor calibration described by equation (12) and the normal weighing mode described by equation (14), the B-factors in those equations are each canceled by "f(T)". This means, in effect, that each step of calibration as well as the normal weighing mode has been carried out using the same value of "F" as if the step were performed at the reference temperature "$T_r$". Therefore, the weight value obtained by equation (14) is unaffected by the actual temperature and has greater accuracy than the value provided by the scale of FIG. 1.

As mentioned above, various embodiments of the invention are possible. According to the presently preferred form of the embodiment of FIG. 2, the reference temperature "$T_r$" is selected as zero degrees on the scale by which "(ppm)" is measured. In this form the factor generator 60 is programmed to compute the simplified general function $$B=[1+(\text{ppm})(10^{-6})T]^{-1} \quad (15)$$

which is used in both the calibration of the belt scale and the normal weighing mode as described above.

According to another form of the embodiment of FIG. 2, the reference temperature "$T_r$" is selected as the temperature at which the K-factoring calibration is performed, and a span calibration is conducted immediately before the K-factoring calibration at the same temperature. In this case each of equations (9) and (11) has the value "1" during the S-factor and K-factor calibrations, and the switch 65 is operated to set the multiplier 56 to "1" for each of these calibrations to determine the values "$S_s$" and "$K_k$". Although "$B_s$" in equation (9) may not have the value "1" during a subsequent span calibration at a later date, this will not affect the calibration if performed by applying a load directly to the load cell and not through the belt, and by setting the multiplier 56 to "1" during this calibration. In this case, for normal scale operation the factor generator 60 is programmed to compute the function of equation (13) in which "$T_r$" equals the temperature at which the last K-factoring calibration was conducted.

In the embodiment of FIG. 3 the load cell 32 is connected to a temperature sensing and compensating circuit 68 which divides its input by the function "f(T)" as defined by equation (8). Conveniently, the elements 32 and 68 are incorporated in a load cell housing 72. The circuit 68 provides the input to the zero shift operator 34. During zero calibration, as in the earlier described embodiments, the operator 34 is adjusted and set to subtract from its input the term "Z/f(T)." Since the value "F" equals the product of its value at the reference temperature times the identical function "f(T)", the result is that the functions "f(T)" are mutually canceled and the input to the integrator 36 equals the value of "F" that would exist at the reference temperature. In this case the selector 64 operates the switch 65 to transfer the value "1" to the multiplier 56, as shown, in all operations when the load is applied through the belt, and the totalizer readout for the normal weighing mode is computed as if carried out at the reference temperature. The resulting improvement in the accuracy of the scale is the same as described above in connection with FIG. 2.

The FIG. 3 embodiment is preferably also provided with the temperature sensor 58 and factor generator 70 for use during span calibrations in which the load is applied directly to the load cell and not through the belt, or in which the output circuit of the load cell has provision to produce a signal corresponding to a test load. In these modes of calibration the output of the load cell does not change according to the function "f(T)". The generator 70 computes the function "f(T)" as defined by equation (8). The selector 64 is operated so that this function becomes the factor in the multiplier 56 and cancels the inverse of "f(T)" applied by the temperature compensation circuit 68.

In the embodiments of FIGS. 2 and 3, the function of the selector 64 in all cases is to ensure that whether or not the load cell has temperature compensation of the kind hereinabove described, the computed weight value "W" as shown on the totalizer 52 is unaffected by the function "f(T)." By this means, the normal weighing mode and all calibrations are automatically conducted with the load cell force effectively converted to the value that would exist at a predetermined reference temperature. Thus it is ensured that in the normal weighing mode, the totalized weight is referred to the same reference temperature which applied in the calibrations of the scale.

In the foregoing description of FIGS. 1, 2 and 3 it has been assumed that the load cell has an output response characteristic with respect to changes in temperature, under static loading, that is as close to zero as possible. In the practice of this invention it may be desired to employ a load cell or cells having a response under static loading that is measurably affected by the temperature. In such cases the load cell 32 as described herein should be understood to include load cells fitted with temperature compensation means of any desired analog or digital type presently known in the art. It will be understood that as presently understood in the art, the temperature compensation so provided is designed to reduce if not fully eliminate the sensitivity of the output response of the load cell itself to temperature changes, and does not take into account the effect of temperature on the dimension "L" as described and dealt with in this description.

I claim:

1. The combination of
   a conveyor having a supporting structure, an endless conveyor belt drivingly supported thereon, load cell means, a support carriage bearing on the load cell means, and a plurality of mutually longitudinally spaced idlers supporting the belt and including at least one idler on the carriage and located to transfer load forces on the belt through the carriage to the load cell means, a transducer responsive to the temperature in the vicinity of the support carriage, a factor generator connected to the transducer, a belt travel transducer driven by the belt, and an integrating computer comprising an integrator responsive to the output of the load cell means and the belt travel transducer, a weight totalizer and at least two multipliers each having a variable output representing a multiplying factor, said computer including connections between said integrator and said multipliers and circuit means to produce an input to said totalizer proportional to the integral of said output of the load means multiplied by both of said multiplier outputs, one of said multipliers being connected to said factor generator.

2. The combination of claim 1, including a temperature sensing and compensating circuit responsive to the temperature in the vicinity of the support carriage, having an input connected to the output of the load cell means, and having an output connected to said computer.

3. The combination of claim 1, in which the factor generator generates a factor proportional to the change in the longitudinal spacing of said idlers as a function of temperature.

4. The combination of claim 1, in which the factor generator generates a factor inversely proportional to the change in the longitudinal spacing of said idlers as a function of temperature.

5. The combination of claim 3, in which the factor generator generates a factor proportional to the change in the longitudinal spacing of said idlers between the ambient temperature and a predetermined reference temperature.

6. The combination of claim 4, in which the factor generator generates a factor inversely proportional to the change in the longitudinal spacing of said idlers between the ambient temperature and a predetermined reference temperature.

7. The combination of claim 5, in which the reference temperature is zero on the scale of said transducer.

8. The combination of claim 6, in which the reference temperature is zero on the scale of said transducer.

9. The combination of claim 1, including selector means for selectively connecting or disconnecting the factor generator from said one of said multipliers.

10. The combination of claim 9, including means for generating a second factor independent of temperature, the selector means being operable to connect said one of said multipliers selectively to the factor generator or to said means for generating a second factor.

11. The combination of claim 10, in which the second factor is "1."

12. The combination of claim 1, in which the factor generator generates a factor causing the product supplied to the totalizer to be converted to a weight value measured at a predetermined reference temperature.

13. The combination of claim 9, in which the factor generator generates a factor causing the product supplied to the totalizer to be convened to a weight value measured at a predetermined reference temperature.

* * * * *

UNITED STATES PATENT AND TRADEMARK OFFICE
CERTIFICATE OF CORRECTION

PATENT NO. : 5,591,942
DATED : January 7, 1997
INVENTOR(S) : Frank S. Hyer

It is certified that error appears in the above-indentified patent and that said Letters Patent is hereby corrected as shown below:

Column 4, line 35, cancel "pans" and substitute --parts--

Column 11, (claim 1), line 5, before "means" insert --cell--

Column 12, (claim 13), line 25, cancel "convened" and substitute --converted--

Signed and Sealed this

Thirteenth Day of May, 1997

Attest:

BRUCE LEHMAN

Attesting Officer

Commissioner of Patents and Trademarks